(No Model.)
H. C. WOODSTOCK.
FASTENER FOR THE MEETING RAILS OF SASHES.
No. 455,085. Patented June 30, 1891.
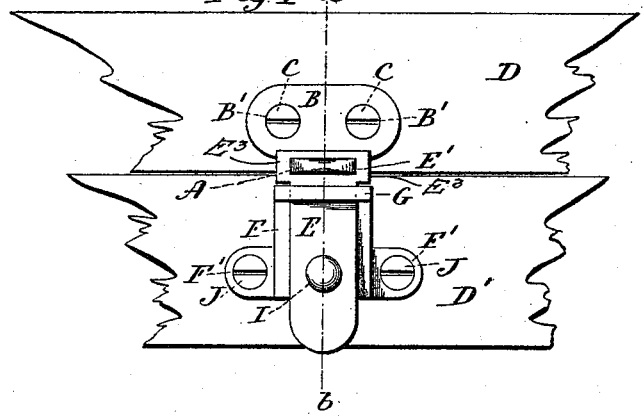
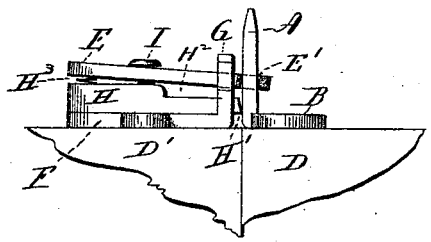
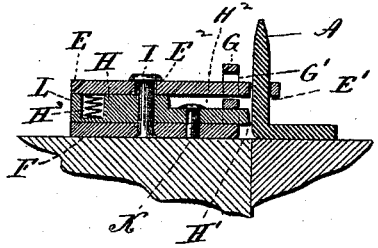

UNITED STATES PATENT OFFICE.

HENRY C. WOODSTOCK, OF BRANFORD, ASSIGNOR OF ONE-HALF TO EDMUND ZACHER, OF NEW HAVEN, CONNECTICUT.

FASTENER FOR THE MEETING-RAILS OF SASHES.

SPECIFICATION forming part of Letters Patent No. 455,085, dated June 30, 1891.

Application filed April 2, 1891. Serial No. 387,339. (No model.)

*To all whom it may concern:*

Be it known that I, HENRY C. WOODSTOCK, of Branford, in the county of New Haven and State of Connecticut, have invented a new Improvement in Sash-Fasteners; and I do hereby declare the following, when taken in connection with accompanying drawings and the letters of reference marked thereon, to be a full, clear, and exact description of the same, and which said drawings constitute part of this specification, and represent, in—

Figure 1, a plan view of a fastening device constructed in accordance with my invention and shown as applied to the meeting-rails of the two sashes of a window; Fig. 2, a view thereof in side elevation with the inner end of the clutch shown in section; Fig. 3, a view of the device in central longitudinal section on the line $a\ b$ of Fig. 1.

My invention relates to an improvement in fastening devices for the meeting-rails of window-sashes, for doors and cupboards, and for use in kindred situations generally, the object being to produce a simple, durable, and reliable lock.

With these ends in view my invention consists in the combination, with a beveled clutch-finger adapted to be secured in place, of a tilting clutch fulcrumed between its ends and constructed to be slipped over the said finger and to grip the same when tilted, a base-plate having the said clutch connected with it and adapted to be secured in place and provided with a guard through which the inner end of the clutch passes.

My invention further consists in certain details of construction and combinations of parts, as will be hereinafter described, and pointed out in the claims.

The clutch-finger A, forming one member of my device, is made straight and slightly reduced in width and beveled at its outer end, its inner end being furnished with a foot B, having two perforations B' B', which receive screws C C for fastening it to the lower rail D of the upper window-sash, and the said finger and foot extending at a right angle to each other. I do not, however, limit myself to this particular construction, as the clutch-finger and its foot may be given a different shape, if desired, and made in two pieces instead of one. The other member of my device is composed of a clutch E, a base-plate F, a guard G, a block H, and a pivot I. The said clutch is provided at its inner end with a transverse opening E', corresponding in shape to the shape in cross-section of the clutch-finger, but very slightly larger than the same, so that it will slip over the said finger when the walls of the opening are parallel with the sides thereof, but clutch the same when it is tilted, as shown by Fig. 2 of the drawings. Said clutch is also provided at a point forward of its center with an opening $E^2$, through which the headed pivot I passes, the opening being sufficiently larger in diameter than the diameter of the pivot to permit the clutch-finger to have a slight tilting or rocking movement thereon.

The base-plate F is provided with two outwardly-projecting ears F' F', the said ears being perforated to receive the two screws J J, by means of which the plate is secured to the upper rail D' of the lower sash. The inner end of the base-plate is turned upward at a right angle to form the guard G, which is constructed near its upper end with a horizontally-elongated opening G', through which the inner end of the clutch passes, the said clutch being slightly enlarged at its inner end to form the shoulders $E^3\ E^3$, which stand just in front of the inner face of the guard in position to engage with the same if the clutch is pushed inwardly. By passing the inner end of the clutch through the guard the said clutch is prevented from swiveling on the pivot I. The block H, which is interposed between the base-plate and the clutch, is thicker at its outer end than either of the said parts, but conforms, except at its extreme inner end, to the shape of the clutch. It is secured in place by the pivot I, by a screw K, and by the insertion of its extreme inner end into the opening G', formed in the guard. The said inner end of the block extends beyond the inner face of the guard, as shown at H', and prevents the inner end of the clutch from being lifted to disengage the clutch by a knife or other slender tool which might possibly be inserted between the two meeting-rails of the sashes. The inner end of the block is cut away, as at $H^2$ to permit, the clutch to be tilted to grip the clutch-finger, as shown by Fig. 2 of the drawings. The outer edge of the block is provided with a recess or pocket H³ to receive a spring L, which impinges against the under face of the outer end of the clutch and exerts a constant effort to tilt the same into its gripping position. This spring, however, is not essential to the operation of my device, as the clutch will be tilted by the action of gravity if the device is arranged in a horizontal plane, as herein shown. Nor is it necessary to employ a spring when the device is applied to a door or in a similar way, inasmuch as the friction between the clutch-finger and the clutch will operate to tilt the clutch into its gripping position when the door is opened. I prefer, however, to employ a spring to assist gravity and friction, although I do not limit myself to a spring arranged as herein shown and described.

It is designed that the upper face of the outer end of the block shall stand at exactly a right angle with the clutch-finger when the two members of the device are standing in their locked positions, so that if the outer end of the clutch is pressed by the finger down upon the said ends of the block the clutch will be moved so as to stand at a right angle with the finger, in which position it readily slips over the same. In order, therefore, to disengage the two members of the fastening for the purpose of moving the window-sashes or opening the door, it is only necessary to press upon the outer end of the clutch. On the other hand, after the clutch has been slipped over and upon the clutch-finger it is caused to tilt and grip the same either by the action of the spring or gravity or by the action of friction, which causes the inner end of the clutch to drag on the finger and grip the same.

My improved device is extremely simple in construction, and not only very easily manipulated, but also efficient and reliable.

If desired, a plate may be combined with the base-plate of the device and arranged to extend across the line on which the two window-sashes come together, so as to act as a guard in preventing anything from being inserted between the sashes to lift the clutch, and so permit one of the sashes to be moved.

I would have it understood that I do not limit myself to the exact construction and arrangement of parts herein shown and described; but hold myself at liberty to make such changes and alterations as fairly fall within the spirit and scope of my invention.

Having fully described my invention, what I claim as new, and desire to secure by Letters Patent, is—

1. In a fastening device, the combination, with a beveled clutch-finger adapted to be secured in place, of a tilting clutch fulcrumed between its ends and constructed to be slipped over the said finger and to grip the same when tilted, and a base-plate having the said clutch connected with it and adapted to be secured in place and provided with a guard through which the inner end of the clutch passes, substantially as set forth.

2. In a fastening device, the combination, with a beveled clutch-finger adapted to be secured in place, of a tilting clutch fulcrumed between its ends and constructed to be slipped over the said finger and to grip the same when tilted, and a base-plate having the said clutch connected with it and adapted to be secured in place and having its inner end turned at a right angle and constructed with a transverse opening for the clutch to pass through, substantially as set forth.

3. In a fastening device, the combination, with a beveled clutch-finger adapted to be secured in place, of a tilting clutch fulcrumed between its ends and constructed to be slipped over the said finger and to grip the same when tilted, a base-plate adapted to be secured in place and having its inner end provided with a guard for the inner end of the clutch, and an independent block mounted upon the said plate and supporting the clutch and having its inner end shaped to clear the inner end of the same, substantially as set forth.

4. In a fastening device, the combination, with a beveled clutch-finger adapted to be secured in place, of a tilting clutch fulcrumed between its ends and constructed at its inner end with an elongated transverse opening adapting it to be slipped over the said finger and to grip the same when tilted, a base-plate having its inner end turned up at a right angle and constructed with an opening through which the inner end of the clutch passes, and a supporting-block mounted upon the base-plate and having its inner end cut away to clear the inner end of the clutch, substantially as described.

5. In a fastening device, the combination, with a beveled clutch-finger adapted to be secured in place, of a tilting clutch fulcrumed between its ends and constructed at its inner end with an elongated opening adapting it to be slipped over the said finger and to grip the same when tilted, a base-plate having said clutch connected with it, and a spring for throwing the clutch into its tilted and operative position, substantially as set forth.

In testimony whereof I have signed this specification in the presence of two subscribing witnesses.

HENRY C. WOODSTOCK.

Witnesses:
HATTIE L. SHEPARD,
JASON P. THOMSON.